US008885974B2

(12) United States Patent
Antonini et al.

(10) Patent No.: US 8,885,974 B2
(45) Date of Patent: Nov. 11, 2014

(54) METHOD AND ASSOCIATED SYSTEM FOR SYNCHRONOUS WAVELET TRANSFORMATION FOR MASSIVE MULTIDIMENSIONAL DATA

(75) Inventors: Marc Antonini, Nice (FR); Anis Meftah, Nice (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 1290 days.

(21) Appl. No.: 12/671,866

(22) PCT Filed: Aug. 4, 2008

(86) PCT No.: PCT/FR2008/001164
§ 371 (c)(1),
(2), (4) Date: Nov. 4, 2010

(87) PCT Pub. No.: WO2009/050355
PCT Pub. Date: Apr. 23, 2009

(65) Prior Publication Data
US 2011/0044560 A1 Feb. 24, 2011

(30) Foreign Application Priority Data
Aug. 3, 2007 (FR) ...................................... 07 05696

(51) Int. Cl.
*G06K 9/36* (2006.01)
*G06T 5/10* (2006.01)
(52) U.S. Cl.
CPC ........................................ *G06T 5/10* (2013.01)
USPC ............................ 382/276; 382/100; 382/154
(58) Field of Classification Search
USPC .................. 382/100, 154, 232, 253, 276, 308
See application file for complete search history.

(56) References Cited

U.S. PATENT DOCUMENTS

| 6,718,065 B1 * | 4/2004 | Goertzen ....................... 382/240 |
| 6,757,343 B1 * | 6/2004 | Ortega et al. ................. 375/340 |
| 6,978,048 B1 | 12/2005 | Higginbottom |

(Continued)

FOREIGN PATENT DOCUMENTS

WO     WO 00/02157 A     1/2000

OTHER PUBLICATIONS

Y. Bao et al., Design of Wavelet-Based Image Codec in Memory-Constrained Environment, IEEE Transactions on Circuits and Systems for Video Technology, May 1, 2001, pp. 642-650, vol. 11, No. 5, , IEEE Service Center, Piscataway, NJ.

(Continued)

*Primary Examiner* — Edward Park
(74) *Attorney, Agent, or Firm* — Arent Fox LLP (57) ABSTRACT

The invention concerns a method of converting raw multidimensional digital data corresponding to points making up a 2D or 3D image of unknown size and an associated system. The method comprises:
- the sizing a multidimensional window for traversing of said image, the said sizing depending on the size of a buffer;
- the traversing the said image comprising the movement of the said window in the image along the axes of the image;
- at each position of the said window in the image:
  - the step of acquisition and loading, in the said buffer, of the data of the part of the image defined by the window;
  - the conversion by calculation of the multidimensional wavelet transform of the said loaded part by means of at least one compact support filter for generating low- and high-frequency coefficients;
  - the saving of the said coefficients generated. Application to wavelet transformation synchronously with the acquisition of medical or seismic images.

18 Claims, 7 Drawing Sheets

(56) References Cited

U.S. PATENT DOCUMENTS

| | | | |
|---|---|---|---|
| 7,502,523 B2* | 3/2009 | Kim | 382/255 |
| 2004/0151385 A1* | 8/2004 | Oneda et al. | 382/232 |
| 2005/0276504 A1* | 12/2005 | Chui et al. | 382/264 |
| 2006/0269156 A1* | 11/2006 | Takahashi et al. | 382/251 |
| 2008/0123979 A1* | 5/2008 | Schoner | 382/242 |

OTHER PUBLICATIONS

C.H. Yang et al., A Block-Based Architecture for Lifting Scheme Discrete Wavelet Transform, IEICE Transactions on Fundamentals of Electronics, Communications and Computer Sciences, May 1, 2007, pp. 1062-1071, vol. E90A, No. 5, Engineering Sciences Society, Tokyo, Japan.

M. Weeks et al., On Block Architectures for Discrete Wavalet Transform, Signals, Systems & Computers, Conference Record of the Thirty-Second ASILOMAR Confrence on Pacific Grove, Nov. 1, 1998, vol. 2, IEEE Service Center, Piscataway, NJ.

T.C. Denk et al., Calculation of Minimum Number of Registers in 2-D Discrete Wavelet Transforms Using Lapped Block Processing, Circuits and Systems, 1994 IEEE International Symposium on London, May 30, 1994, pp. 77-80, vol. 3, IEEE, New York, NY.

* cited by examiner (1a)

(2a) Starting object C (2b) C1 + D1

Fig. 2

(4a) Analysis (4b) Synthesis

Fig. 4

(3a) Starting object $C_0$ (3b) Object $C_2$ after 2 simplification levels (3c) Object $C_3$ after 3 simplification levels (3d) Object $C_4$ after 4 simplification levels

$L_h = 2n+1$ (6a) low-pass filter $L_g = 2m+1$ (6b) high-pass filter

(10a) mangement of edges by addition of 0

(10b) management of edges by replication (10c) management of edges by symmetry

$x_k$: source data
$s_k$ and $d_k$: coefficients calculated by filtering

(15a) Z -: Area to be filtered along axis x (15b) Z': Area to be filtered along axis y (15c) Z": Area to be filtered along axis z

METHOD AND ASSOCIATED SYSTEM FOR SYNCHRONOUS WAVELET TRANSFORMATION FOR MASSIVE MULTIDIMENSIONAL DATA

CROSS-REFERENCE TO RELATED APPLICATION

This application is a National Stage entry of International Application No. PCT/FR2008/001164, filed Aug. 4, 2008, which claims priority of French Application No. 0705696, filed Aug. 3, 2007. The disclosure of the prior application is hereby incorporated in its entirety by reference.

The invention concerns the field of the processing of two- or three-dimensional images and more particularly wavelet transforms of multidimensional images.

The latest methods for acquiring 3D volume images may generate petabytes (1024×1024 gigabytes) of raw digital data. These volume data may be of different natures such as for example seismic cubes, medical images (scanner sections etc) or the like. A dual problem is posed with regard to this quantity of data: firstly storage is expensive and secondly the processing time is excessive, for example for manipulating, displaying, transmitting or compressing these data with or without loss.

This dual problem also exists with regard to the acquisition and use of 2D surface images, for example high definition scanner sections.

The spectacular development of systems for acquiring 3D seismic data, such as for example the system developed at Ifremer (Geoscience 336-2004, pp. 579-585), has enabled the acquisition of more and more detailed 3D objects. The most vivid example is the Hydratech campaign carried out off Norway, which has enabled the acquisition of 3D objects with very high resolutions. For example, the 3D seismic object of FIG. 1 requires several days of scanning and produced a file that weighs 150 gigabytes.

The problem is posed when it is a case of manipulating, processing and displaying these very large volumes of data. This is because the display of the object or the compression thereof requires the entire loading thereof into random access memory before processing, which is not possible in current solutions, since its enormous size would require several hundreds of gigabytes of random access memory!!

A first aim of the invention is to propose a solution for processing these multidimensional objects of very large sizes using a minimum of resources (disk space and random access memory).

Another aim of the invention is to optimise the computing time for such processing operations with regard to the resources used.

Using multiresolution analysis for the decomposition of complex objects in order to facilitate navigation in the data thereof, display, transmission, compression, etc is known.

Figure 3:
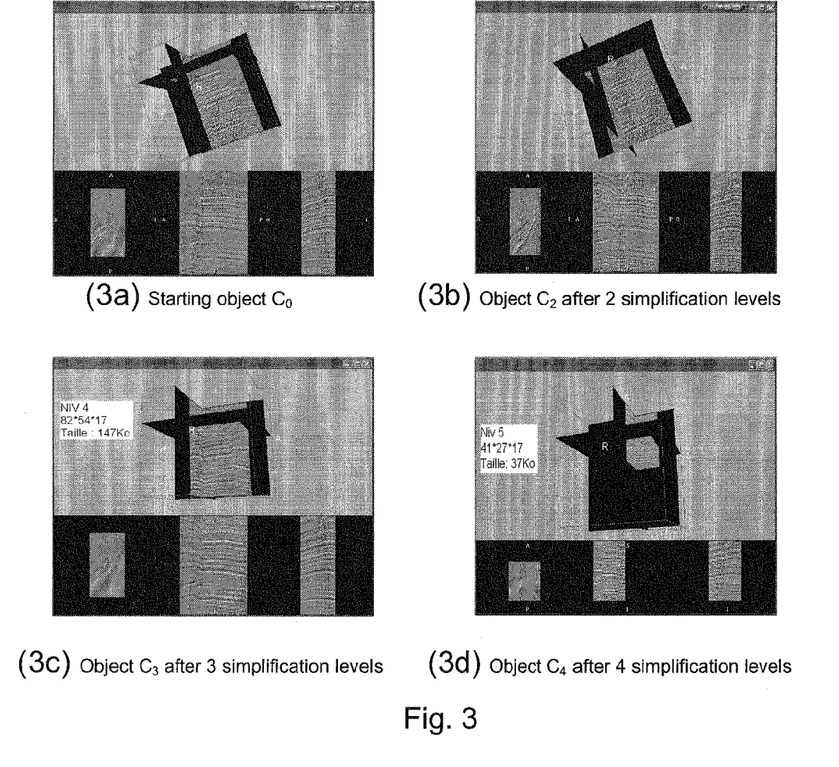
Figure 4:
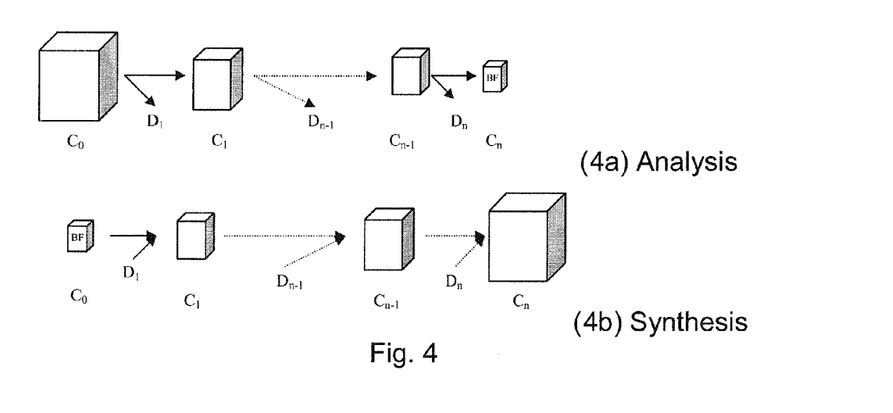

The main idea of multiresolution analysis is to decompose (by means of a filtering) an initial 2D or 3D object $C_0$ into two sets: a coarser object $C_1$ with a lower resolution and a smaller size (see FIG. 2) and a set of high-frequency details $D_1$. By repeating this process, a multiresolution representation of the original object (different versions $C_1$, $C_2$, $C_3$ etc) is obtained according to the required level of detail (see FIGS. 3 and 4). At the end of the analysis step, a low-resolution object $C_N$ and a set of details $D_1, D_2 \ldots D_N$ are obtained. The synthesis step subsequent to the multiresolution representation consists of reconstructing the object, by means of a filtering, starting from its coarser version $C_N$ and on each occasion adding all the corresponding sets of details. At the end of the synthesis step, the starting object $C_0$ is recovered. FIG. 4(a) illustrates the principle of multiresolution analysis by decomposition and FIG. 4(b) illustrates the principle of synthesis.

Wavelet transformation is widely used in the field of signal processing, in particular compression, and applies particularly well to a multiresolution analysis. For the software or hardware implementation of this transformation, it is normal to use transformations by filter banks or transformations by lifting scheme.

The prior art already proposes to divide the 3D volume into several sub-blocks and to process them independently of one another (Journal of VLSI Signal Processing, 41, pp. 209-223, 2005). This document describes in particular a method of converting raw multidimensional digital data corresponding to points making up a 2D or 3D image, the method comprising a step of sizing a window for traversing the image, the traversing of said image and, for each sub-block traversed, calculation of the wavelet transform of said raw data of the sub-block, and finally a saving step.

Figure 5:
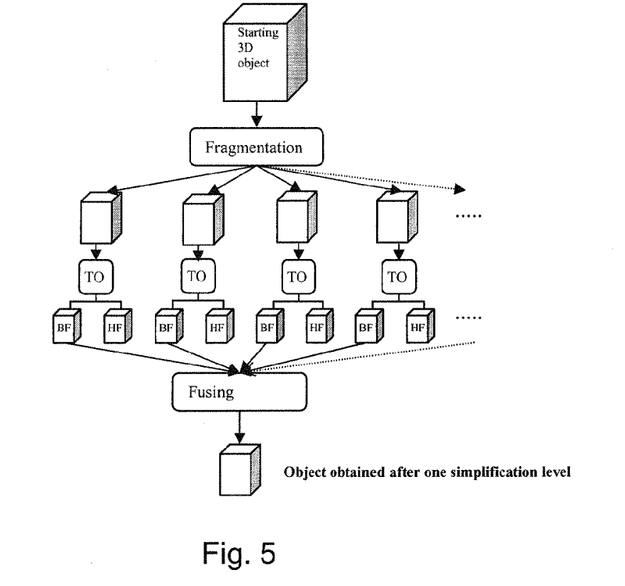
FIG. 5 describes schematically a known solution for the processing of massive 3D data.

The technique disclosed amounts to considering the 3D image as being the concatenation of several small cubes with a memory size acceptable for processing. Next the wavelet transform is calculated on each sub-cube as being a separate object. Once all the sub-cubes have been calculated, a fusion step is effected in order to obtain the final result. This method is shown schematically by FIG. 5. The initial 3D object passes through a fragmentation step in order to generate the various sub-cubes. On each of these sub-cubes, the wavelet transformation is applied. Finally, a fusion step is applied.

Because of the fragmentation and processing sub-block by sub-block, the memory required for the processing is reduced.

Nevertheless, this solution has several drawbacks.

Firstly, the preliminary fragmentation step performs a division of the image according to sub-multiples of the dimensions of the image. As a result there is a need to know a priori the total size of the image in order to perform this step. Such a solution cannot therefore be applied to an image in the course of acquisition. Another aim of the invention is to enable the processing of large images gradually as they are acquired.

It should also be noted that the determination of the total size of the image requires either the entire loading of the image, or at least the reading of all the data of the image.

Moreover, the processing of the voxels at the edges of the blocks depends not on the voxels in the adjacent blocks but rather on "virtual" voxels added by symmetry. This cause block effects on the final result, similar to those obtained with JPEG in 2D imaging. Another aim of the invention is to eliminate any artefact of the "block effect" type.

Equally, it is necessary to add to the processing time the time associated with two other steps: a fragmentation step and a fusion step that require accesses to the hard disk, appreciably increasing the computing time having regard to the volume of data in the 3D images processed. The processing time thereof is then increased. One aim of the invention is to reduce the processing time for the conversion of the data of the image.

Moreover again, additional disk space is necessary for saving the various blocks and the calculations made on these. This disk space is equal to the size of the object. For example, for the object in FIG. 1, it is necessary to count 150 gigabytes of additional storage space on the hard disk. Another aim of the invention is then to reduce the consumption of memory space during the processing of the data. In particular, the random access memory available is generally limited. There then exists a need to enable the processing of large multidimensional images taking account of the random access memory space available.

The same limitations are present for large 2D objects and the solutions by sub-blocks similar to that disclosed previously.

Image processing methods applied to the acquisition of satellite images and to video are also known.

The methods used for video processing consider a favoured filtering axis, the time axis, according to which a sliding filtering by window is performed, the other two axes being processed by a conventional 2D transformation (for example in wavelets). In this solution, complete loading of the images or frames is performed in memory at each instant of the video, for example images of size 1920×1080 pixels if the 1080i or 1080p HD video format is considered.

This complete loading of the images requires large random access memory resources, the size of which the invention aims to limit. This is because a 2D section of a 3D cube (for example FIG. 1) may have very high resolution, higher than 8000×8000 pixels, which makes the application of a (2D+t) video approach tricky since it would require the storage in random access memory of several 2D sections of very high resolution, which is difficult or even impossible for current systems.

In addition, favouring an axis for conversion gives rise to complications in the use of the converted image. For example, for a 3D image where a conversion direction (O,z) is favoured, the display of a section along the plane (O,x,y) requires synthesis of the entire 3D image. There is therefore a need not to favour one axis since all the dimensions must be considered in an equivalent fashion. Another aim of the invention is then to propose a solution for converting large images not favouring one particular dimension of the multidimensional image.

In the case of satellite acquisition, the satellite makes a rotation about the earth and a simultaneous acquisition by a monodimensional sensor. The 2D image acquired is thus infinite in the direction of movement of the satellite. In the same way as video, the methods used then make a conversion favouring the movement axis and loading the entire 1D image acquired at a given instant by the sensor. The same problems as for video conversion apply.

At least one of the aims indicated above is achieved by the present invention by the determination of a transit window of the image being acquired according to the size of the random access memory available independently of the knowledge of the total size of the image and by the application of a multidimensional wavelet transformation to the sub-block defined by the window at each location of its traverse. The window then traverses the image gradually as it is acquired. It is thus possible to proceed with the calculation of the transform without a priori knowledge of the final image and, by virtue of the approach by sub-blocks, with the processing of large images.

To this end, the subject matter of the invention is first of all a method of converting raw multidimensional digital data corresponding to points making up a 2D or 3D image of unknown size, the method comprising:
  a step of sizing a multidimensional window for traversing of the said image, the said sizing depending on the size of a buffer;
  a step of traversing the said image comprising the movement of the said window in the image along the (dimensional) axes of the image;
  at each position of the said window in the image:
    a step of acquiring and loading, in the said buffer, raw data ($x_k$) of the part of the said image defined by the window;
    a conversion step comprising a step of calculating the multidimensional wavelet transform of the said loaded part by means of at least one compact support filter for generating low-frequency ($s_k$) and high-frequency ($d_k$) coefficients;
    a step of saving the said coefficients generated.

"Unknown size" means the fact that the size of the image along the various axes thereof is unknown because the conversion processing is carried out gradually (synchronously) along with the acquisition of the data without knowing the end of this acquisition, that is to say able to be determined but not calculated and not used for the conversion process (for example if the data are already stored on a hard disk, it is possible to determine the dimensions of the resulting image but the invention does not require such knowledge).

The raw digital data (denoted $x_k$ for point k) are data representing a numerical physical measurement value, for example the luminance at a point (pixel, voxel) by echography, sounding, scanning, X-radiography, etc. They are generally acquired along three orthogonal axes.

The wavelet transformation is carried out from raw data in random access memory.

The window used is regular, of the 2D window type in the case of surface images and of the cubic or parallelepipedal type in the case of a volume image. The "part defined by the window" contains all the points encompassed/enclosed by the contours of the window placed on the image.

A "compact-support filter" is well known to persons skilled in the art. A compact-support filter is such that the coefficients of the filter are zero outside a certain window (filter of finite width) that corresponds to the "filter support". In other words the filter is of the finite impulse response type. The use of compact-support filters makes it possible to effect wavelet transformations using a limited number of original raw data and therefore to effect such transformations on sub-blocks of the final image rather on the whole of the image.

According to the invention, the sizing of the transit window independently of the size of the image and the traversing of the image by this window make it possible to process the image gradually as it is acquired without a priori knowledge of the image in its entirety (other points and/or final size).

To simplify the calculations and therefore to reduce the resource and time necessary, provision is made for the said filters to be monodimensional separable filters.

In particular, the said calculation step comprises:
  successively along each of the dimensional axes of the said loaded part, a step of calculating the monodimensional separable wavelet transform of each of the lines extending along the said axis, the said step of calculating the transform of each of the said lines comprising:
    for each point (k) on a line of the said loaded part, the calculation of a coefficient ($s_k$, $d_k$) by separable-wavelet transformation from data stored in the buffer.

Thus, a decomposition is carried out of the conversion into a line by line traverse along successively the two or three dimensions of the image and by the calculation of the local separable-wavelet transform coefficients. This approach makes it possible to calculate the final conversion coefficients by multipass (along each of the dimensions) using simpler filters and thus to considerably simplify the calculations that result therefrom.

In one embodiment, the said multidimensional wavelet transformation is a transformation by filter bank:

$$s_k = h_0 x_{2k} + \sum_{i=1}^{n} h_i (x_{2k-i} + x_{2k+i})$$

$$d_k = g_0 x_{2k+1} + \sum_{i=1}^{n} g_i (x_{2k+1-i} + x_{2k+1+i})$$

where $s_k$ and $d_k$ are the coefficients ($s_k$: low frequency; $d_k$: high-frequency details) of the transform calculated respectively at points 2k and 2k+1 along the line travelled and $\{h_i\}$ and $\{g_j\}$ are respectively the coefficients of low-pass and high-pass symmetrical filters.

According to an alternative, the said monodimensional wavelet transformation is a transformation by 2N-step lifting scheme:

$$d_k^0 = x_{2k+1}$$

$$s_k^0 = x_{2k}$$

$$d_k^n = d_k^{n-1} - \sum_{i=1}^{L_{2n+1}/2} \alpha_i^{2n+1}(s_{k+1-i}^{n-1} + s_{k+i}^{n-1}) \ \forall n \geq 1$$

$$s_k^n = s_k^{n-1} + \sum_{i=1}^{L_{2n}/2} \alpha_i^{2n}(d_{k-i}^n + d_{k-1+i}^n) \ \forall n \geq 1$$

where $s_k^N$ and $d_k^N$ are coefficients of the transform calculated respectively at points 2k and 2k+1 along the line travelled, and $\{\alpha_i^n\}$ are the coefficients of the prediction and updating operators of the lifting scheme.

It is also envisaged that the said filters are non-separable multidimensional filters, in which case the calculation of the conversion coefficients is made in a single pass but requires more powerful computing resources.

Through the use of compact-support filters, the calculation of the coefficients is said to be "local". In particular, the step of calculating the multidimensional wavelet transform may comprise the calculation at one point (k) of one of the said wavelet transform coefficients ($s_k$, $d_k$) and the replacement, in the buffer, of the data item associated with the point (k) by the said calculated coefficient ($s_k$, $d_k$).

This substitution makes it possible to reduce the memory size necessary for the storage of the transform coefficients. This is because it is possible to make this substitution as soon as the data to be overwritten is no longer useful for calculating subsequent coefficients, which is the case through the use of compact-support filters.

This approach is compatible both with non-separable filters and with separable filters for which the multiple passes along the various dimensions of the image/of the loaded part require the replacement of the old data with the (intermediate) coefficients calculated for each new pass.

In order to make the substitution only when the data item to be overwritten is not longer useful, provision is made, before the said substitution step, for the said calculated coefficient ($s_k$, $d_k$) to be stored temporarily in a buffer (Temp).

In particular, when the wavelet transformation uses monodimensional separable filters of maximum length (M), it is envisaged that the said temporary memory (Temp) is a shift register with a size at least equal to $\lfloor M/2 \rfloor$, where $\lfloor \ \rfloor$ is the lower integer part function. Thus the offset introduced by the register makes it possible to wait until the wavelet transform filter has "slid" by a sufficient number of points to allow overwriting by replacement of a data item (of a point) by a coefficient calculated and stored in the register. Because of the monodimensional nature of the filter, this temporary memory is of reduced size.

As an alternative, when the wavelet transformation uses monodimension separable filters of maximum width (M), it is also envisaged that the size of the said temporary memory (Temp) is at least equal to the maximum value of the dimensions of the said part loaded in buffer and the said substitution comprises the copying of the said temporary memory in the said buffer when all the coefficients ($s_k$, $d_k$) of the said line travelled are calculated and stored in the temporary buffer (Temp). Thus, when the wavelet transform is calculated line by line according to the two or three dimensions of the loaded area, the coefficients of the whole of a line are stored before replacing the entire line by all the coefficients calculated. This is because the data are no longer useful once a line has been fully calculated since the filters are monodimensional (the data of the same line are self sufficient for calculating the coefficients).

A larger temporary memory for temporarily storing data according to several dimensions may be provided in the case of non-separable filters.

In one embodiment, the method comprises a step of sequencing the said coefficients ($s_k$, $d_k$) in order to separate the low-frequency ($s_k$) and high-frequency ($d_k$) coefficients. This sequencing is carried out so as to preserve the relative positions of the coefficients in the image. It can be carried out:
  once the said coefficients ($s_k$, $d_k$) have been calculated for the entire part loaded and have been substituted in the buffer, or
  in the case of monodimensional separable filters, at the end of the calculation of the transform of the entire line travelled or at the end of the calculation of the transforms along an entire dimensional axis of the image.

In particular the coefficients are next saved separately in a digital file relating to the low frequencies (coefficients $s_k$) and one or more digital files relating to the high-frequency details (coefficients $d_k$). It is thus possible, from a single file of the low-frequency coefficients, to synthesise the final image with a lower resolution.

In the multi-resolution approach making it possible to work subsequently at different resolution levels of the image, provision is made for the method to comprise, for each position of the said window, a plurality of iterations of the said conversion step, the said step of calculating a wavelet transform of an iteration being performed on the coefficients ($s_k$, $d_k$) generated during the previous iteration. It is normally carried out in one to five iterations. The number of iterations may however be greater depending on the initial resolution of the image.

In particular, when the coefficients are substituted in random access memory, the step of calculating the wavelet transform remains unchanged since it applies not to the old values stored in random access memory but to the coefficients newly calculated and stored in the random access memory.

According to the chosen dimensions of the window, the said traversing comprises the movement of the said window, along successively each of the axes of the image, by a step equal to the dimension of the said window along the movement axis.

It is also envisaged that the said sizing of the window also depends on the length of the filters used for the wavelet transformations.

In order to avoid the edge effects known in solutions of the prior art of the type consisting of fragmentation into sub-blocks, provision is made, during the said loading, for raw data ($x_k$) also to be loaded, associated with points external to the window and adjacent to the edges of the said window, so as to effect the said wavelet transformation of the internal points in the vicinity of the said edges taking account of the said data of the external adjoining points. The said adjoining points chosen are those that participate in the calculation of the coefficients with regard to the points of the part loaded in the vicinity of the boundaries of the window and depend on the width of the filters used.

When monodimensional separable filters of width 2p+1 are used, "p" pixels/voxels extra per line to be traversed on each side of the window are loaded.

The "internal" points are the points encompassed/enclosed in the contours of the window in question, as opposed to the "external" points.

In order to increase the speed of conversion of the entire image or to adapt to the data acquisition speed, it is envisaged putting the said loading and conversion steps in parallel for at least two distinct windows along the said traversing of the image.

Another object of the invention is a system for implementing the method. The system for converting raw multidimensional digital data (xk) corresponding to points (k) making up a 2D or 3D image of unknown size, comprises:

means of sizing a multidimensional window for traversing of the said image, the said sizing depending on the size of a buffer memory;

means arranged to traverse the said image by movement of the said window in the image along the axes of the image;

acquisition and loading means arranged to acquire and load, at each position of the said window in the image, in the said buffer, raw data (xk) of the part of the said image defined by the window;

conversion means arranged to calculate the multidimensional wavelet transform of the said part loaded by means of at least one compact support filter for generating low-frequency ($s_k$) and high-frequency ($d_k$) coefficients;

saving means able to save the said generated coefficients in memory.

Another object of the invention is a method of synthesising a plane in a 3D image converted by wavelet transformation as presented above, comprising a step of determining all the said parts of the image intersected by the said plane, a step of reverse wavelet transformation of the coefficients of the said determined parts and a step of synthesising the said plane from the data calculated during the reverse transformation step.

In particular, the reverse transformation step is reiterated according to the required resolution level.

Equally, a step of transmitting the coefficients of the said parts from a server to a computer can be provided, the computer performing the said reverse transformation step gradually as the said parts are received.

The invention applies in particular to the synchronous processing (wavelet transformation) of the acquisition of medical images by scanner, terrestrial prospection images, for example seismic images, or other massive data not able to be stored in their entirety in memory or during acquisition (and therefore unknown in their totality at a time t).

The invention will be better understood with the help of the following detailed description and the accompanying figures, in which:

FIG. 1 shows two views (FIGS. 1a and 1b) of an example of a display of a 3D seismic cube;

FIG. 2 illustrates a step of the multiresolution analysis process for the object called "Mercury" in two views (FIGS. 2a and 2b);

FIG. 3 illustrates the object "Mercury" at different simplification/decomposition levels (FIGS. 3a to 3d);

FIG. 4 illustrates the principle of the analysis (FIG. 4a) and of the multiresolution synthesis (FIG. 4b);

FIG. 6 illustrates the form of the filter banks in question (low-pass filter at FIG. 6a and high-pass filter at FIG. 6b);

FIG. 10 illustrates various methods (FIGS. 10a to 10c) for the edge management;

FIG. 15 shows the change in the area to be filtered respectively along the axis x (FIG. 15a), y (FIG. 15b) and z (FIG. 15c) during the execution of the algorithm;

Reminder of Wavelet Transforms

For calculating wavelet transforms, use is made of the most usual transformations in the field of image and video compression and which are divided into two large families: transformations by banks of filters and transformations by lifting scheme.

Figure 6:
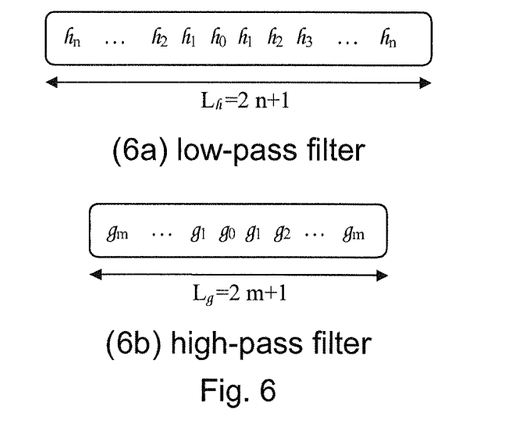

In the case of transformations by banks of filters, the most usual filters are used, which are the Daubechies 9/7 biorthogonal filter and the 5/3 filter (the two numbers indicate respectively the length $L_h$ of the low-pass filter and the length $L_g$ of the high-pass filter) and the Haar filter but the method remains valid for all compact-support filters. FIG. 6 shows the form of the filter banks in question.

The high-pass (FIG. 6b—coefficients $\{h_i\}$) and low-pass (FIG. 6a—coefficients $\{g_i\}$) filters are symmetrical with odd lengths.

The formulae that enable calculation of the low-frequency coefficients denoted $s_k$ and the high-frequency wavelet coefficients $d_k$ of the input signal $x_k$ are given by:

$$s_k = h_0 x_{2k} + \sum_{i=1}^{n} h_i (x_{2k-i} + x_{2k+i}) \tag{1a}$$

$$d_k = g_0 x_{2k+1} + \sum_{i=1}^{n} g_i (x_{2k+1-i} + x_{2k+1+i}) \tag{1b}$$

For application of these formulae, the points $x_k$ of the input signal are such that $x_k$ and $x_{k+1}$ are adjoining points along the same dimension.

Figure 7:
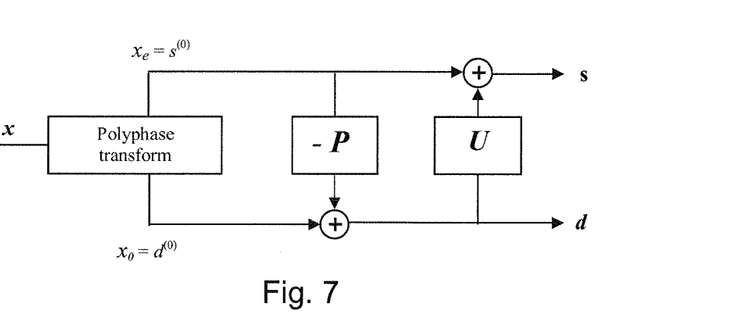
FIG. 7 illustrates an example of a wavelet transformation by 2-step lifting scheme.

Transformation by lifting scheme is a second-generation wavelet transformation introduced by Sweldens in 1996 and consists of separating the signal into two channels (polyphase transformation) and next applying prediction and updating operations in order to obtain the low frequency (LF) and high frequency (HF) of the signal. FIG. 7 show a lifting stage composed of two lifting steps: P representing the prediction operation and U the updating operation (U=update).

Let an N-step lifting scheme (N/2 stages) be denoted ($L_1$, $L_2$, ..., $L_N$) where $L_{2n+1}$ designates the number of coefficients of the $n^{th}$ prediction operator and $L_{2n}$ designates the number of coefficients of the $n^{th}$ updating operator. The operator for each lifting step is symmetrical with even length.

Figure 8:
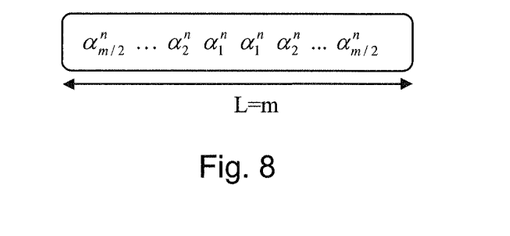
FIG. 8 illustrates the coefficients of the prediction or updating operator of the $n^{th}$ lifting step for the transformation scheme of FIG. 7.

FIG. 8 shows the form of the coefficients of the prediction or updating operator.

The formulae that calculate the wavelet coefficient of index k of the $n^{th}$ lifting stage (denoted $s_k^n$ and $d_k^n$) of the input signal $x_k$ are:

$$d_k^0 = x_{2k+1} \tag{2a}$$

$$s_k^0 = x_{2k} \tag{2b}$$

$$d_k^p = d_k^{p-1} - \sum_{i=1}^{L_{(2p+1)/2}} \alpha_i^{2p+1} \left( s_{k+1-i}^{p-1} + s_{k+i}^{p-1} \right) \forall p \geq 1 \tag{2c}$$

$$s_k^p = s_k^{p-1} + \sum_{i=1}^{L_{2p}/2} \alpha_i^{2p} (d_{k-i}^p + d_{k-1+i}^p) \forall p \geq 1 \tag{2d}$$

The 5/3 transverse filter can be implemented by means of a lifting scheme (2,2) and the 9/7 filter by the two-stage lifting scheme (4 lifting steps) (2,2,2,2).

The efficiency and the calculation time of the method depend enormously on the type and size of the filter used.

Figure 9:
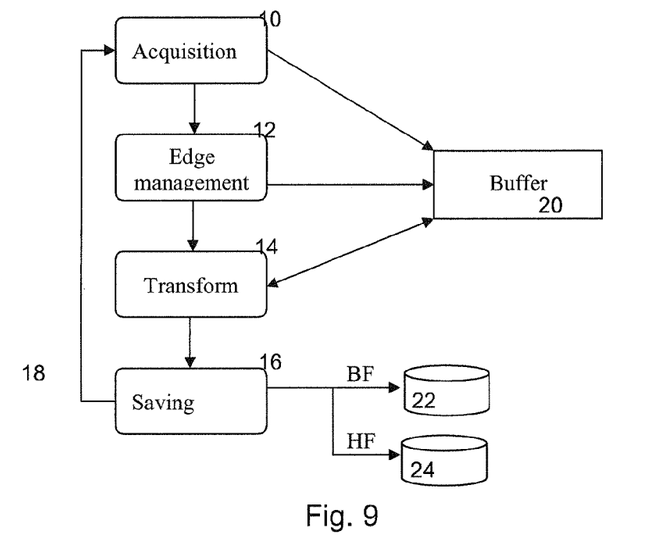
FIG. 9 shows schematically the various steps of the method proposed in the present invention.

The conversion method according to the invention will now be described in more detail with reference first of all to FIG. 9. In particular, the example presented below is based on the use of separable wavelet transforms. The method comprises the following different steps:

the input signal is for example a volume 3D object. The first step 10 consists of the acquisition of data for loading these into a buffer 20. The subsequent local processing (the calculation of the wavelet transform) will be applied to these loaded data. During the acquisition step, the parts to be loaded and the load in the buffer 20 are defined. The efficiency of the method is greatly linked to the way of acquiring the data.

This acquisition can consist of the reading of a file already existing in memory or the concrete acquisition of new measurements by a sensor, of the scanner type, along with the processing.

The acquisition made is said to be regular in that it is based on a regular sampling, typically lines regularly spaced apart along the three dimensions of the image (orthogonal reference frame), the points preferably being aligned with one another.

The acquisition data are the luminance $x_k$ at a point k of the image. The value k is an index incremented along with the acquisition so that two adjoining points have adjoining indices. The point k can also be expressed according to the coordinates in the orthogonal reference frame: $X_k, Y_k, Z_k$.

The buffer 20 is the memory reserved by the user for calculating the wavelet transform. The size of this memory defines the size of the memory defines the size of the area of the object that the algorithm can process and therefore defines the quantity of data $x_k$ to be loaded into the buffer 20 during step 10. The greater its size the faster will be the algorithm;

the edge management step 12 makes it possible to deal with the edge problems that may possible arise when the transform is calculated;

the following transformation step 14 makes it possible to calculate the wavelet transform of the area of the 3D object loaded in the buffer 12;

finally, the saving 16 separates the low-resolution or low-frequency LF images (Ci) and the high-frequency HF details (Di) of the 3D object, and saves them in the appropriate files 22, 24 on the disk.

The saving 16 initiates (18) the process for the following part if the object has not been processed in its entirety, that is to say by the acquisition 10 of another part of the object for processing.

Figure 10:
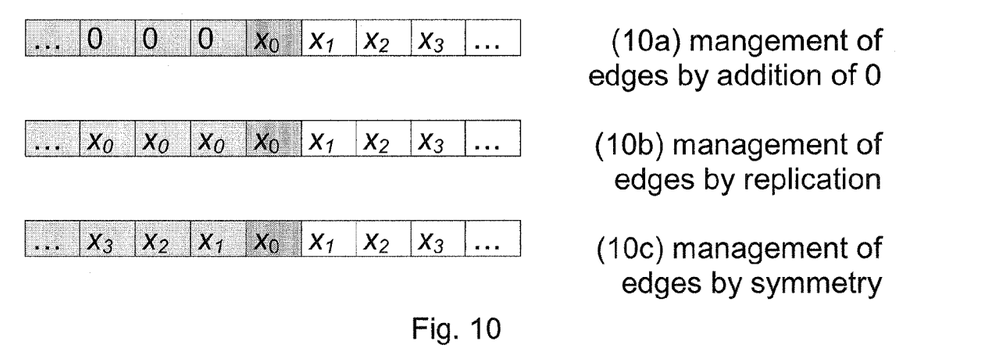

The management of the edges (12) requires the following matters:

There are several ways for managing the edges such as for example symmetry, replication of voxels, addition of pixels identical to the pixel being processed etc, but the use of these methods on the various areas loaded will introduce a block effect and a reconstruction that may not be exact. To solve this problem the calculation is performed using the true voxels when available (that is to say when the edge of the area to be processed does not correspond to an edge of the image). Since the filters used are compact-support filters, it is possible to determine the number and location of the voxels to be used for calculating the coefficients at the edges. Which means that the true voxel is loaded when it exists, otherwise one of the conventional symmetry approaches is adopted. In this case, it is proposed to effect the symmetry with respect to the last voxel available (cf. FIG. 10(c)) but the other approaches remain valid.

Figure 11:
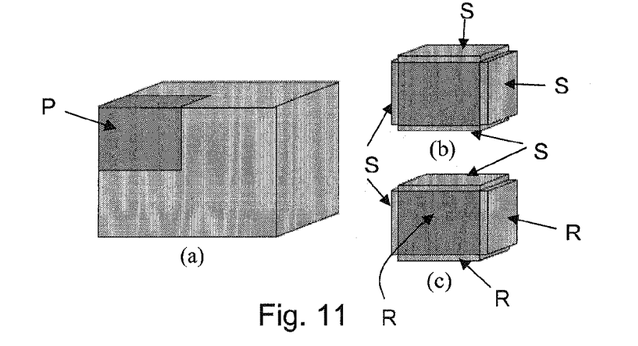
FIG. 11 illustrates the edge management with the conventional approach (b) and with the approach adopted in the present invention (c)

Assume for example that the part P (cf. FIG. 11(a)) of a 3D object is processed. The conventional approach loads this area P into memory and then effects the symmetry of the voxels loaded (parts S FIG. 11(b)), whatever the position of the block to be processed in the 3D object. According to the invention, the area to be treated is loaded into memory, and then a certain number of voxels existing in the 3D object necessary for preventing edge effects (part R of FIG. 11(c)). The non-existent voxels (for example in the case where a block on the edge of the 3D object is processed cf. FIG. 11(c)) are then symmetrised as described previously (part S of FIG. 11(c)). It should be noted that, when the block processed is not situated on one of the edges of the 3D object, then no symmetrisation processing is necessary since in this case all the voxels necessary for filtering (parts R) exist in the 3D object and are loaded in memory. The edge effect introduced by the local processing of the data is thus avoided.

The areas R have a thickness (perpendicular to the plane of the window) of $\lfloor L/2 \rfloor$ voxels (L is the width of the filter used).

After the loading of the area to be processed with the corresponding edges (parts S and R), the coefficients are calculated in wavelets. For this purpose, the same filtering equations are used (formula 1 or 2) but changing the indices. Thus, for the transformations by filter banks, there is:

$$s_k = h_0 x_{2k} + \sum_{i=1}^{L_h/2} h_i(x_{2k-i} + x_{2k+i}) \; k = L_h/2 \ldots T + L_h/2$$

$$d_k = g_0 x_{2k+1} + \sum_{i=1}^{L_g/2} g_i(x_{2k+1-i} + x_{2k+1+i}) \; k = L_g/2 \ldots T + L_g/2$$

and for the transformations by lifting schema:

$$d_k^0 = x_{2k+1} \; k = L/2 \ldots T + L/2$$

$$s_k^0 = x_{2k} \; k = L/2 \ldots T + L/2$$

$$d_k^p = d_k^{p-1} - \sum_{i=1}^{L_{2p+1}/2} \alpha_i^{2p+1}(s_{k+1-i}^{p-1} + s_{k+i}^{p-1}) \; \forall \, p \geq 1 \; k = L/2 \ldots T + L/2$$

$$s_k^p = s_k^{p-1} + \sum_{i=1}^{L_{2p}/2} \alpha_i^{2p}(d_{k-i}^p + d_{k-1+i}^p) \; \forall \, p \geq 1 \; k = L/2 \ldots T + L/2$$

with T the size of the area to be processed in the direction considered.

As indicated previously, the part of the image loaded depends directly on the size of the available buffer 20. Hereinafter, the calculation of the memory size necessary for the processing:

The size of the random access memory 20 necessary for filtering a block, apart from management of edges, is calculated as follows:

The calculations of the memory space necessary for the simultaneous processing for the transformations by banks of filters, calculations below made with reference to the biorthogonal filters, remain valid for the transformations by two-step lifting scheme by changing the coefficients and the lengths of the filters.

Let $L_h$ and $L_g$ respectively be the length of the high-pass and low-pass filter and let $$M = \text{Max}(L_h, L_g). \tag{3}$$

In order to process a part of the image of dimension $$D = x*y*z, \tag{4}$$

a buffer 20 of dimension B is needed:

$$B = (x+L)*(y+L)*(z+L) \text{ with } L = M-1 \tag{5}$$

Since the same filter is used during filtering for each of the three dimensions (filtering by separable filters), there is therefore the same need in additional memory for managing the edges, which is given by $$\left\lfloor \frac{M}{2} \right\rfloor$$

for each side. $\lfloor \; \rfloor$ designates the smaller integer part. However, M is odd, since the filters are of odd length, and therefore $$\left\lfloor \frac{M}{2} \right\rfloor = \frac{M-1}{2}.$$

The number of coefficients to be added in each axis is therefore given by:

$$L = 2 * \left\lfloor \frac{M}{2} \right\rfloor = M - 1 \tag{6}$$

By developing equation 5 it is found that $$B = L^3 + L^2(x+y+z) + L(xz+yz+xy) + xyz \tag{7}$$

For the 9/7 filter L=8 and, assuming that x=y=z there will be $$B(x) = 512 + 192x + 24x^2 + x^3 \tag{8}$$

This equation gives the size of the area to be processed at each iteration for 9/7 filter, according to the size of the buffer 20. For example, if there is 1 megabyte of RAM (20) and the wavelet coefficients are coded in float (32 bits), this gives:

$$B(x) = 1048576 \text{ bytes for } 262144 \text{ coefficients.}$$

To find the size x of an edge of the block in numbers of coefficients, the following equation is solved:

$$x^3 + 24x^2 + 192x - 261632 = 0$$

which gives $$s_1 = -40.0000 + 55.4256i$$

$$s_2 = -40.0000 - 55.4256i$$

$$s_3 = 56.0000$$

However, x is a positive integer, and hence the solution x=56. It is therefore possible to choose as a window delimiting the area to be loaded (10) into the buffer 20 a cube with a side of not more than 56 voxels.

Other configurations of windows can be used, in particular parallelepipeds more or less elongate according to practice.

It should also be noted that the present method makes it possible to reduce the processing area (window) to a single pixel/voxel: x=1. The processing of the edges as disclosed below allows this approach to within a pixel unlike the known fragmentations methods which, because of ineffective edge management, require windows at least as wide as a half filter.

Figure 12:
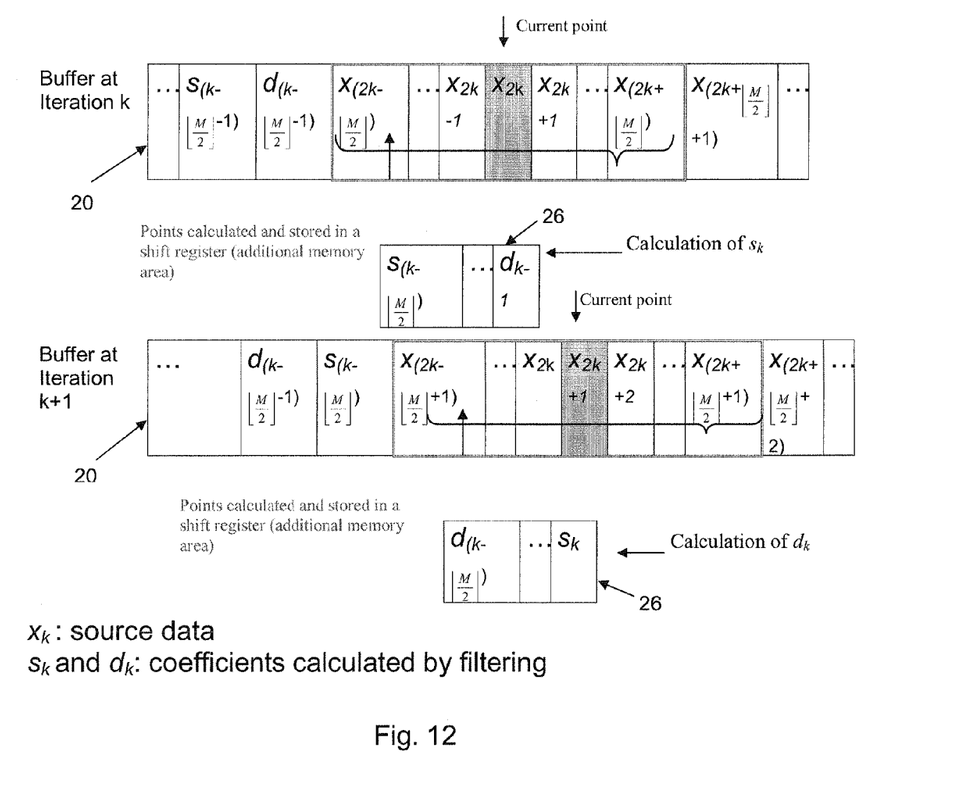
FIG. 12 shows the change in the buffer and supplementary memory used as the processing advances.

It is necessary to add to this area another memory area 26 for the calculation and partial saving of the coefficients. This is because, for calculating $S_k$, it is necessary to effect a convolution using formula (1a) and therefore it is necessary to know the values of the voxels $$X_{(k-\lfloor \frac{M}{2} \rfloor)} \ldots X_k \ldots X_{(k+\lfloor \frac{M}{2} \rfloor)}.$$

Which means that it is not possible to save in the buffer the values $$S_{(k-\lfloor \frac{M}{2} \rfloor)} \ldots S_{k-1},$$

previously calculated, except after the calculation of the coefficients using $$x_{(k-\lfloor \frac{M}{2} \rfloor)} \ldots x_{k-1}.$$

And hence the need for an additional memory area 26 of size $$\left\lfloor \frac{M}{2} \right\rfloor$$

in order to temporarily save the wavelet coefficients calculated. FIG. 12 shows the change in the content of the memories used as the processing continues in the loaded area. To reduce the calculation time (to eliminate the shifts made in the shift register), this additional memory is oversized by fixing its size at the maximum value of the dimensions of the loaded area (max ($x_c$, $y_c$, $z_c$), with $x_c$, $y_c$, $z_c$ the dimensions of the area to be processed).

The memory size necessary for the edge management is calculated as follows:

The size of the area necessary for the edge management depends on the filter used. According to equation (6), L=M−1.

Let $S_b$ be the size of the area added in memory to manage the edges. Since the area to be processed has a parallelepipedal shape, voxels will be added to the six faces, which gives:

$$S_b = 2 * \left(x * y * \frac{L}{2}\right) + 2 * \left(x * z * \frac{L}{2}\right) + 2 * \left(y * z * \frac{L}{2}\right) \quad (9)$$

After all simplifications have been made, there is obtained:

$$S_b = L*(x*y + x*z + y*z) \quad (10)$$

In this way the ratio of total memory size to memory size of the block is determined:

Suppose that the area to be processed is a cube. Let S be the size of this area. Using (4) gives $S=x^3$. The area loaded in memory will be equal to $S_T = S + S_b$.

Using (10) there is obtained:

$$S_T = x^3 + 3Lx^2 \quad (11)$$

Let us calculate the ratio $S_T$ to $S_b$, which corresponds to the ratio of the total size of the image to be processed (with edge management) with respect to the size of the image without the edges:

$$R(x) = \frac{S_T}{S_b} = 1 + \frac{3L}{x} \quad (12)$$

Figure 13:
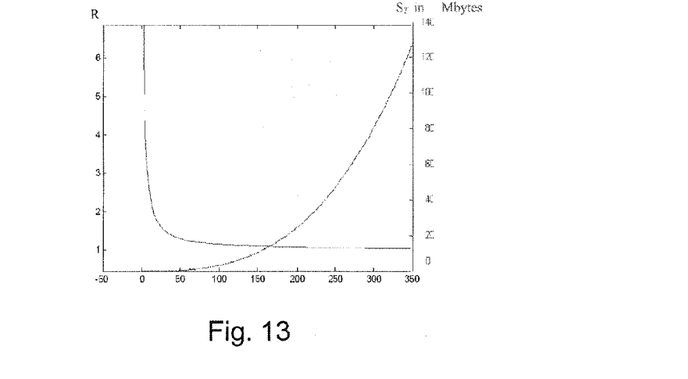
FIG. 13 illustrates the change in R (ratio of size to be loaded into memory to memory size used because of the edge management) and $S_T$ (size of the data to be loaded into memory) as a function of the size x of the area to be processed for the 9/7 filter.

The curve R as a function of x for the 9/7 filter is given in FIG. 13. To minimise the processing time it is advantageous to take a dimension x that minimises R (and therefore x large). Since the smaller the block, the more additional disk access will be made to manage the edges of the various parts. It is therefore advantageous to have large blocks. x is chosen so that the ratio R is as small as possible taking account of the available memory space. This is because the more x increases the more the random access memory requirements will increase. In FIG. 11, the curve of $S_T$ as a function of x is also found. For the 9/7 filter it is possible to take x=200 since the level part commences as from this value and the variation in the curve becomes small. For this value of x there will be a need for approximately 25 megabytes of RAM memory.

Figure 14:
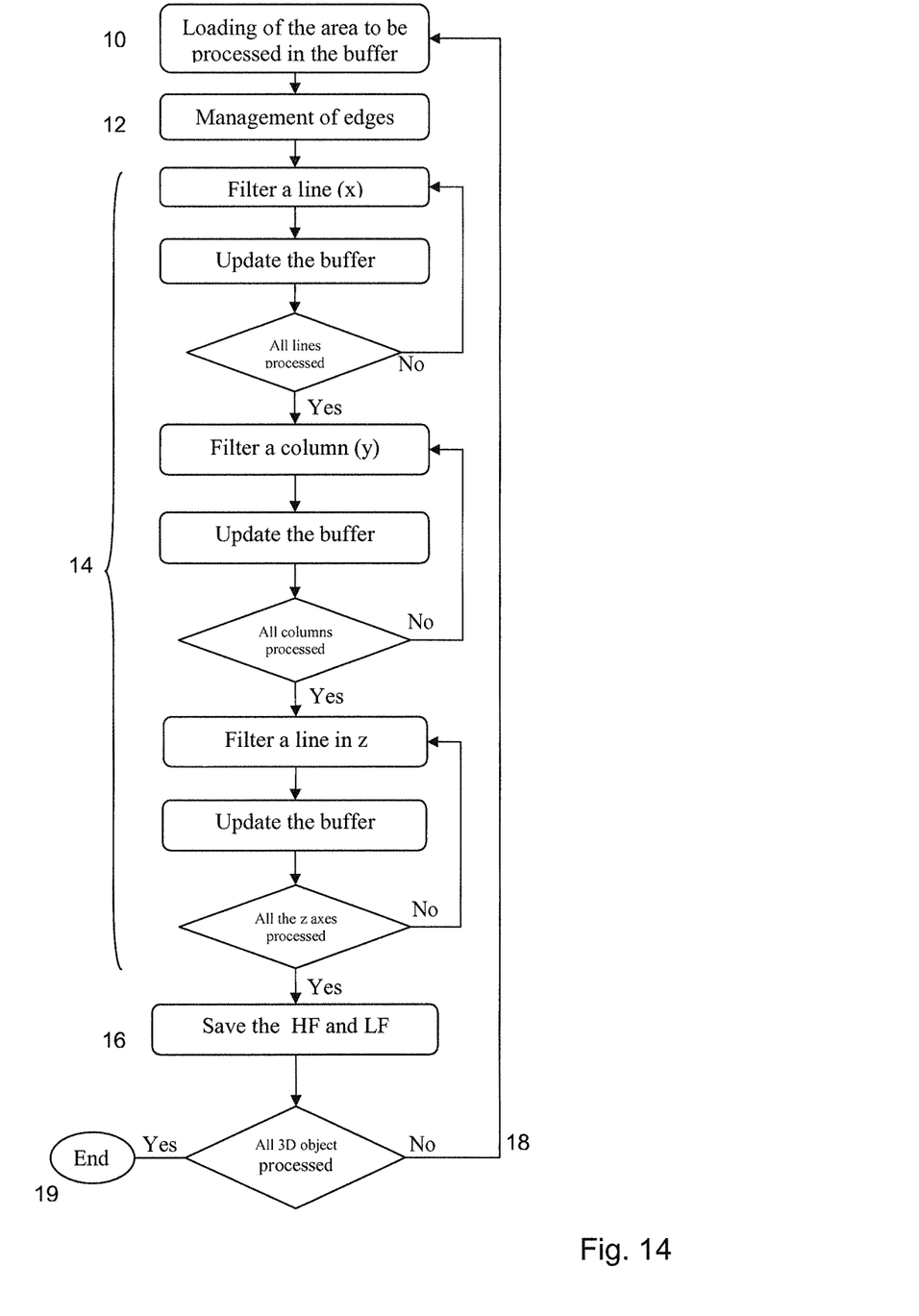
FIG. 14 shows flow diagram of an example embodiment of the invention.

The flow diagram of the algorithm for calculating the synchronous transformation for the transformations by filter banks is given by FIG. 14. The algorithm remains valid for the transformations by two-step lifting scheme by changing the filter coefficients. For the N-step lifting schemes with N>2 it is necessary to make a few modifications to the algorithm by adding the other stages of calculating the coefficients of the steps with indices greater than 2. This means that the filtering in x (cf. flow diagram in FIG. 14) is composed of N/2 filtering blocks where each block affects a prediction step and an updating step.

The steps of the algorithm are as follows:
1. Opening of the entries file in read mode or direct acquisition from a sensor;
2. Opening the exit files in write mode, those where the saving of the calculated coefficients takes place. It should be noted that, with a decomposition level of a 3D image, it is necessary to provided a file for the low-resolution (low-frequency) coefficients and seven for the seven high-frequency bands.
3. As long as there remain non-processed samples
   3.1. Loading, by reading or acquisition (10), the part to be processed defined by the window (area de dimension x*y*z) calculated previously.
   3.2. The management of the edges (12) is integrated in the calculation of the transform (see below 3.3 to 3.5) using the area of dimension (x+L)*(y+L)*(z+L) and not only x*y*z.

Because of the monodimensional separable filters used, the algorithm proceeds by passages on the lines successively along the three dimensions (x, y, z).
   3.3. The first step is the traverse along the axis y:
   for i traversing the axis z (1: z+L)
      3.3.1. For j traversing the axis x (1: x+L)
         3.3.1.1. For k traversing the axis y (L/2: y+L/2) (FIG. 15(a)—cube minus the two lateral tranches of thickness L/2)
            3.3.1.1.1. calculating $$s_k = h_0 x_{(j,2k,i)} + \sum_{l=1}^{n} h_l (x_{(j,2k-1,i)} + x_{(j,2k+l,i)})$$

Figure 15:
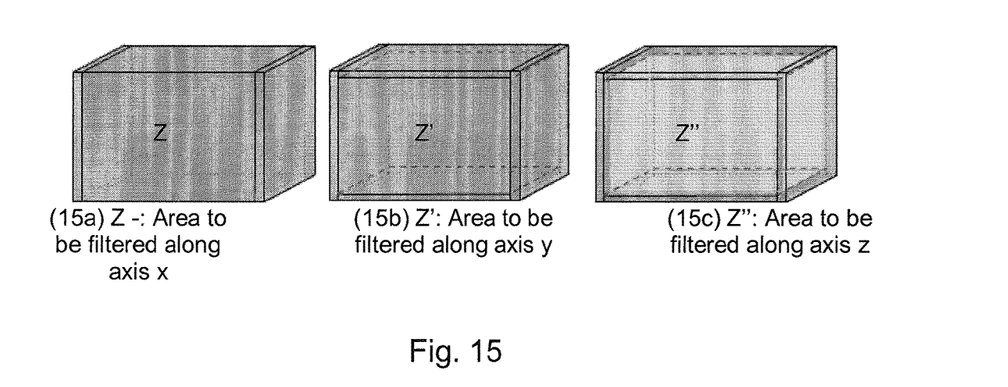

3.3.1.1.2. calculating $$d_k = g_0 x_{(j,2k+1,i)} + \sum_{l=1}^{n} g_l (x_{(j,2k+1-l,i)} + x_{(j,2k+1+l,i)})$$

3.3.1.1.3. storing $s_k$ and $d_k$ in vect, where vect represents a float vector of dimension d=max(x, y, z) which represents the additional memory 26
         3.3.1.2. sequencing Vect in order to separate the coefficients LF and HF
         3.3.1.3. copying the content of Vect 26 into the same location in the buffer 20
   3.4. continue by passing along the axis x for i traversing the axis z (1: z+L)
      3.4.1. for j traversing the axis y (L/2: y+L/2)
         3.4.1.1. for k traversing the axis x (L/2: x+L/2) (FIG. 15(b)—cube FIG. 15(a) minus the two top and bottom tranches of thickness L/2)
            3.4.1.1.1. calculating $$s_k = h_0 x_{(2k,j,i)} + \sum_{l=1}^{n} h_l (x_{(2k-l,j,i)} + x_{(2k+l,j,i)})$$

3.4.1.1.2. calculating $$d_k = g_0 x_{(2k+1,j,i)} + \sum_{l=1}^{n} g_l (x_{(2k+1-l,j,i)} + x_{(2k+1+l,j,i)})$$

3.4.1.1.3. storing $s_k$ and $d_k$ in vect
         3.4.1.2. sequencing Vect
         3.4.1.3. copying the content of Vect in the same location in the buffer 3.5. Finally the traverse along the axis z for I traversing the axis y (L/2: y+L/2)
   3.5.1. for j traversing x (L/2: x+L/2)
      3.5.1.1. for k traversing the axis z ((L/2: z+L/2) (FIG. 15(c)—cube FIG.15(b) minus the two front and rear tranches of thickness L/2)
         3.5.1.1.1. calculating $$s_k = h_0 x_{(j,i,2k)} + \sum_{l=1}^{n} h_l(x_{(j,i,2k-l)} + x_{(j,i,2k+l)})$$

3.5.1.1.2. calculating $$d_k = g_0 x_{(j,i,2k+1)} + \sum_{l=1}^{n} g_l(x_{(j,i,2k+1-l)} + x_{(j,i,2k+1+l)})$$

3.5.1.1.3. storing $s_k$ and $d_k$ in vect
      3.5.1.2. sequencing Vect
      3.5.1.3. copying the content of Vect into the same location in the buffer
3.6. the low-resolution coefficients $s_k$ are saved (16) in the appropriate file.
3.7. the high-resolution coefficients $d_k$ are saved (16) in the appropriate files.
3.8. the selection window is moved in the 3D object if not all the parts have been processed (18).
4. close (19) the output and input files.

To achieve a multi-scale decomposition, steps 3.3 to 3.5 are reiterated (according to the decomposition level chosen, from 1 to 5 generally) from the coefficients calculated during the previous iteration and stored in the buffer 20. Step 3.6 is carried out when these iterations are finished.

It should be noted that the processing of a part of the object does not depend on the result of the other parts of the 3D object. This property is very important since it allows the distributed processing of the object by several machines at the same time by giving to each machine the part of the object to be processed. Which represents an important asset for further reducing the computing time using techniques such as calculation grids and in particular when it is a case of processing very large objects.

Results Obtained by the Method According to the Invention

All the tests were carried out with a computer equipped with a 2.13 GHz. Intel E6400 processor, 2 gigabytes of RAM and a 250 gigabyte Western Digital hard disk. The filter used in this example is the lifted Haar filter calculated on integers, which means that the values of the wavelet coefficients obtained are integer. The algorithm was implemented in C++.

The results obtained from the method that we propose show clearly that the memory size necessary is very small even for processing gigantic objects. In addition, the processing is carried out in a very short time compared with the size of the object, without using any additional disk space.

Figure 2:
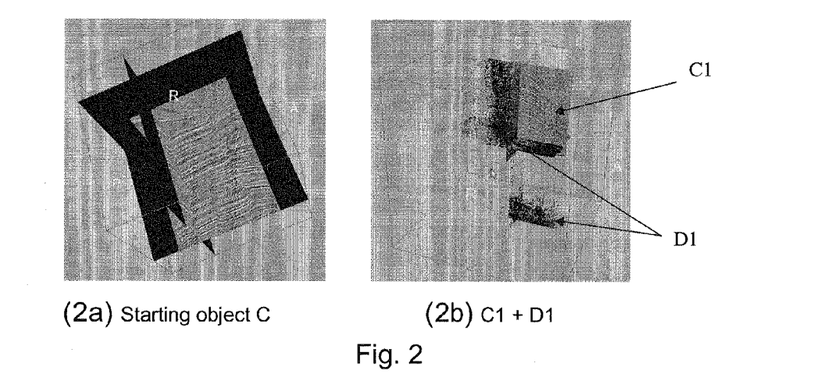

The following table gives the calculation times and the memory size used for carrying out a wavelet transformation on one resolution level (analysis on one resolution level) for different sizes of object. The objects correspond to 3D seismic cubes but identical results will be obtained on other types of 3D volume data (for example medical data). The objects obj1 and obj2 and obj3 are objects that were generated for the tests.

TABLE 1

Memory cost and calculation time for the analysis of different 3D objects. The final object corresponds to the object after an analysis level by the "synchronous" wavelet transformation.

| Object processed | Size of initial object | Size of low-frequency object obtained | Memory used for processing | Processing time between initial object and final object |
|---|---|---|---|---|
| Mercury (Fig. 2) | 566 megabytes | 71 megabytes | 3 megabytes | 55 secs |
| Obj1 | 4.52 gigabytes | 565 megabytes | 7 megabytes | 7 min 40 secs |
| Obj2 | 36.16 gigabytes | 4.52 gigabytes | 13 megabytes | 55 min 13 secs |
| Obj3 | 72.33 gigabytes | 9.04 gigabytes | 26 megabytes | 1 h and 57 min |

Let us calculate now the coding cost without loss of the various sub-bands obtained by the decomposition (the LF sub-bands and the HF sub-bands). For this we will calculate the Shannon entropy of each sub-band by means of the formula:

$$H = -\sum_{i=0}^{n} p(i)\log_2(p(i)) \text{ bits/voxel} \quad (13)$$

where n to the number of possible luminance levels that a voxel of a given sub-band can take. In the case of a transformation on the integers and for the example proposed here, n=256 for the low-frequency sub-band and n=512 for each high-frequency sub-band.

The value p(i) corresponds to the probability of appearance of the luminance level i.

The entropy of the entire object after wavelet transformation on N levels is given by the following formula:

$$H_T = \frac{H_N(0) * D(N)}{D(0)} + \sum_{i=1}^{N}\left(\frac{D(i)}{D(0)}\sum_{j=1}^{7} H_i(j)\right) \text{ bits/voxel} \quad (14)$$

with $H_i(j)$ the entropy of the $j^{th}$ sub-band of level i (i=0 corresponds to the LF sub-band) and D(i) the size of the object at level i (number of voxels in the object at level i). D(0) is the size of the original object.

The total cost in bytes of the object after transformation on N levels is given by:

$$C = \frac{1}{8}\left[H_N(0) * D(N) + \sum_{i=1}^{N}\left(D(i)\sum_{j=1}^{7} H_i(j)\right)\right] \text{ bytes} \quad (15)$$

The following table gives the entropy and the coding cost for the Mercury object on a wavelet decomposition level.

TABLE 2 calculation of the entropies expressed in bits per voxel (bpv) of the Mercury object for a wavelet decomposition level.

| Entropy in bpv | Mercury object |
| --- | --- |
| Dimensions (voxels) | 1300 * 858 * 260 |
| Dimensions of the sub-bands (voxels) | 650 * 429 * 130 |
| Entropy of the sub-band 0 (LF) | 7.252453 |
| Entropy or the $1^{st}$ HF sub-band | 5.548126 |
| Entropy of the $2^{nd}$ HF sub-band | 4.739920 |
| Entropy of the $3^{rd}$ HF sub-band | 3.840312 |
| Entropy of the $4^{th}$ HF sub-band | 5.442115 |
| Entropy of the $5^{th}$ HF sub-band | 4.021207 |
| Entropy of the $6^{th}$ HF sub-band | 3.369744 |
| Entropy of the $7^{th}$ HF sub-band | 2.756940 |
| Initial size of the object | 16 bpv ie 566 megabytes |
| Entropy of the initial object | 7.281342 bpv ie 252 megabytes |
| Entropy of the transformed object | 4.422760 bpv ie 152.9 megabytes |

We note that the Shannon theoretical entropy of the object after a wavelet transformation on a decomposition level is very much less than the cost of the original object without transformation. This example therefore illustrates the capability of the wavelet transform to represent the information without loss and in a more compact fashion.

From a practical point of view, the use of sophisticated entropic coders such as contextual arithmetic coders would make it possible to obtain even better lossless compression results.

It should be noted that the invention can also be implemented with loss.

Figure 16:
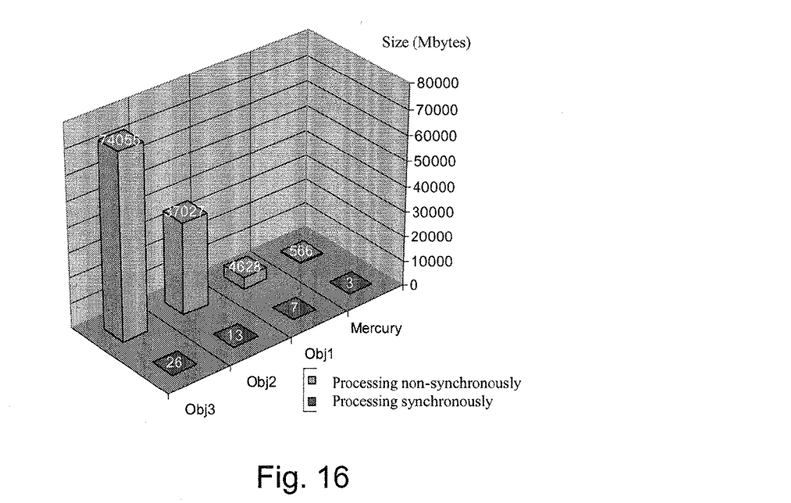
FIG. 16 is a histogram of the RAM memory used for the processing of various objects.

FIG. 16 shows the memory quantity necessary for the processing of various objects simultaneously. It can be observed that the memory used is very small and does not exceed 5‰ for Obj3, which makes approximately 26 megabytes of RAM.

Figure 17:
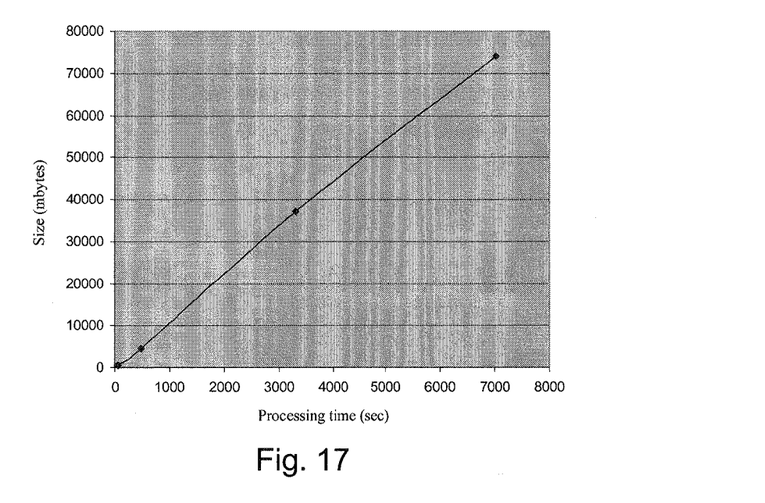
FIG. 17 is a graph showing the calculation time as a function of the size of the 3D object.

FIG. 17 traces the curve of the calculation time as a function of the size of the object processed. It can be observed that the processing time is linear with respect to the size of the file, which makes our method capable of processing objects exceeding terabytes. By calculating the slope of the straight line found it is possible to bring out a function that calculates for us the computing time (seconds) according to the size of the object (megabytes). This function f is given by the following expression f(S)=S/10.61 where S represents the size of the object in megabytes. For an object that is 500 gigabytes the processing time will be approximately 13 hours, which is rapid compared with the size of the object since only the reading of the binary file of the 3D object would require approximately 4 hours based on a mean rate of 40 megabytes/second for a standard disk.

The exploitation of the 3D image thus converted and of the coefficients calculated requires a synthesis of the data. This synthesis can be carried out synchronously.

The synchronous implementation of the synthesis step does not require additional calculations or resources. This is because the synthesis is exactly the reverse of the analysis step and does not require additional calculations. Tests show that the same times and costs are obtained as those that are obtained for the analysis (table 1). However, the advantage of our method is that we are capable of effecting a local synthesis of the data.

For the use of compact-support filters, a local synthesis of the data is carried out.

Figure 1:
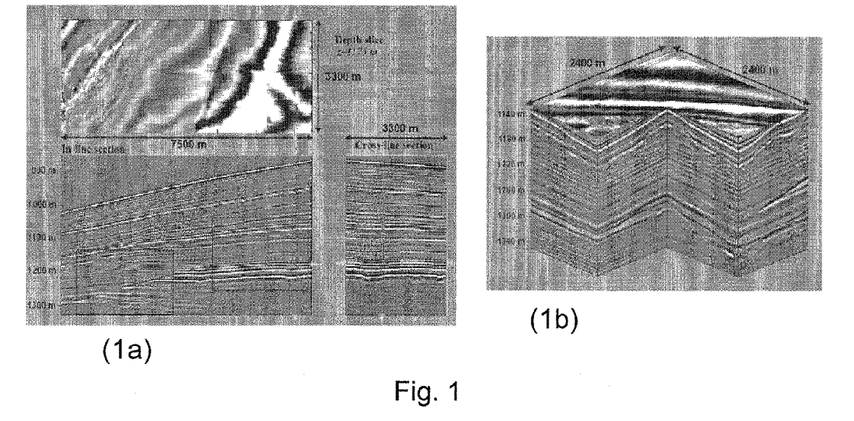

In 3D imaging, one is always confronted with enormous volumes, and experts need to view not the entire object at the same time (impossible to load in view of its size), but rather a low-resolution version of the object in order to locate himself and navigate in the volume and the 3 planes X, Y and Z in high resolution (FIG. 1). With the approach proposed, it is possible to locate oneself easily by virtue of the spatio-frequency property of the wavelets and the dyadic implementation. After this location step, the coefficients necessary for going back all the levels of the planes X, Y and Z from the low resolution are sought. To display the transverse plane Y for example, there is no need to synthesise the entire object and afterwards extract it but quite simply to seek just the details necessary for synthesising this plane. This feature is very important especially when objects are manipulated at a distance since it will not be possible to transmit the entire object because of its size. Therefore only the wavelet coefficients that make it possible to go back over the various resolution levels as far as the most detailed are sent. The analysis can commence as soon as the first wavelet coefficients are received and this makes it possible to reconstitute the plane of the most resolved level progressively as the coefficients are received, unlike current systems that pass directly from the least detailed level to the most detailed level at one go.

It is also possible to make a local analysis within the plane itself, since the cutting planes may reach resolutions exceeding 8000*8000 pixels (impossible to display in their entirety with current screens, the maximum resolution of which is 2560*1600 for 30 inch screens). It is therefore possible to make the analysis just of the part that will be displayed, which will afford a saving at the bandwidth level, since fewer data will be sent, and a saving with regard to computing time, since the area to be processed will be reduced even further.

The approach adopted by the present invention is based on the processing of the data as they are acquired or read, which affords a maximum reduction in the random access memory size necessary for processing. The invention thus makes it possible:

to process the object without fragmenting it;
to use for this purpose a minimum memory size, which can be defined by the user;
to obtain a filtering result identical to what would have been obtained if the entire object had been loaded into memory. This is because, unlike current algorithms that process 3D volume objects by fragmentation, giving rise to artefacts at the edges of the fragmented blocks, the approach proposed manages the filtering at the edges of the blocks, which eliminates any artefact of the "block effect" type due to fragmentation;
random navigation in the transformed 3D object is possible. For example, an extraction of three planes x, y and z of any area of the object is possible (cf. FIG. 3) and a full-resolution reconstruction of these three planes is possible without making the reverse transformation of the entire object.

The invention claimed is:

1. A method of converting raw multidimensional digital data ($x_k$) corresponding to points (k) making up a multidimensional image including a two dimensional (2D) or three dimensional (3D) image of an unknown size, to be implemented by one or more processors, the points forming lines along axes of the multidimensional image, the method comprising:

a step of sizing, via the one or more processors, a multidimensional window for traversing of the multidimensional image of unknown size, wherein the sizing depends on a size of a buffer memory;
a step of traversing, via the one or more processors, the multidimensional image comprising a movement of the multidimensional window in the multidimensional image along the axes of the multidimensional image;
at each position of the multidimensional window in the multidimensional image of unknown size:
   a step of acquiring, via the one or more processors, raw data ($x_k$) of a part of the multidimensional image of unknown size defined by the multidimensional window and loading the raw data ($x_k$) in the buffer memory;
   a conversion step comprising a step of calculating, via the one or more processors, a multidimensional wavelet transform of the loaded part of the multidimensional image by means of at least one compact support filter for generating low-frequency ($s_k$) and high-frequency ($d_k$) coefficients, the calculating step comprising, successively along each of the axes of the loaded part, filtering each of the lines extending along the axis; and
   a step of saving, via the one or more processors, the generated low-frequency ($s_k$) and high-frequency ($d_k$) coefficients.

2. The method according to claim 1, wherein the at least one compact support filter includes separable monodimensional filters.

3. The method according to claim 2, wherein the sizing of the multidimensional window is also a function of lengths of the filters used for the multidimensional wavelet transformation.

4. The method according to claim 1, wherein the step of calculating the multidimensional wavelet transform comprises:
   successively along each of the axes of the loaded part, calculating a monodimensional wavelet transform in separable wavelets of each line extending along the axis, wherein
   for each point (k) on a line of the loaded part, a coefficient ($s_k$, $d_k$) is calculated by separable wavelet transform from the raw data ($x_k$) stored in the buffer memory.

5. The method according to claim 4, wherein the monodimensional wavelet transform is a transformation by a filter bank as shown in the following expressions:

$$s_k = h_0 x_{2k} + \sum_{i=1}^{n} h_i(x_{2k-i} + x_{2k+i})$$

$$d_k = g_0 x_{2k+1} + \sum_{i=1}^{n} g_i(x_{2k+1-i} + x_{2k+1+i})$$

where $s_k$ and $d_k$ are coefficients of the wavelet transform calculated respectively at points 2k and 2k+1 along the line travelled (Li), and
$\{h_i\}$ and $\{g_j\}$ are respectively coefficients of low-pass and high-pass symmetrical filters.

6. The method according to claim 4, wherein the monodimensional wavelet transformation is a transformation by a 2N step lifting scheme as shown in the following expressions:

$$d_k^0 = x_{2k+1}$$

$$s_k^0 = x_{2k}$$

$$d_k^n = d_k^{n-1} - \sum_{i=1}^{L_{2n+1}/2} \alpha_i^{2n+1}(s_{k+1-i}^{n-1} + s_{k+i}^{n-1}) \; \forall n \geq 1$$

$$s_k^n = s_k^{n-1} + \sum_{i=1}^{L_{2n}/2} \alpha_i^{2n}(d_{k-i}^n + d_{k-1+i}^n) \; \forall n \geq 1$$

where $s_k^n$ and $d_k^n$ are coefficients of the wavelet transform calculated respectively at points (2k) and (2k+1) along the line travelled (Li), and
$\{\alpha_i^n\}$ are coefficients of prediction and updating operators of the 2N step lifting scheme.

7. The method according to claim 4, wherein the step of calculating the multidimensional wavelet transform comprises calculating, at a point (k), one of the wavelet transform coefficients ($s_k$, $d_k$) and replacing, in the buffer memory, the raw data ($x_k$) associated with the point (k) with the calculated wavelet transform coefficient ($s_k$, $d_k$).

8. The method according to claim 7, wherein, before the replacing, the calculated coefficient ($s_k$, $d_k$) is stored temporarily in a temporary memory (Temp).

9. The method according to claim 8, wherein the multidimensional wavelet transformation uses monodimensional separable filters of a maximum width (M) and the temporary memory (Temp) is a shift register with a size at least equal to $\lfloor M/2 \rfloor$, where $\lfloor \; \rfloor$ is a lower integer part function.

10. The method according to claim 8, wherein the multidimensional wavelet transformation uses monodimensional separable filters of a maximum width (M), a size of the temporary memory (Temp) is at least equal to a maximum value of dimensions of the part loaded in the buffer memory, and the replacing comprises copying content of the temporary memory in the buffer memory when all the coefficients ($s_k$, $d_k$) of the line (Li) have been calculated and stored in the temporary memory (Temp).

11. The method according to one of claims 7 to 10, comprising, after the coefficients ($s_k$, $d_k$) have been calculated for the part loaded and have been replaced in the buffer memory, a step of sequencing the coefficients ($s_k$, $d_k$) in order to separate into the low-frequency ($s_k$) and high-frequency ($d_k$) coefficients.

12. The method according to claim 1, wherein the filters are non-separable multidimensional filters.

13. The method according to claim 1, further comprising, for each position of the multidimensional window, a plurality of iterations of the conversion step, the multidimensional wavelet transform calculation step of an iteration being performed on the coefficients ($s_k$, $d_k$) generated during a previous iteration.

14. The method according clam 1, wherein the step of traversing comprises moving the multidimensional window, along successively each of the axes of the multidimensional image, by a step equal to a dimension of the multidimensional window along each of the axes.

15. The method according to claim 1, wherein, during the loading, raw data ($x_k$) associated with points external to the multidimensional window and adjacent to borders of the multidimensional window are loaded into the buffer memory, so as to effect the multidimensional wavelet transformation of the points in a vicinity of the borders taking an account of data of the external adjacent points.

16. The method according to claim 1, wherein the loading and conversion steps are performed in parallel for at least two distinct multidimensional windows along the traverse of the multidimensional image.

17. A method of synthesizing a plane in a three dimensional 3D image converted by the wavelet transformation according to claim 1, comprising:
 a step of determining parts of the multidimensional image intersected by the plane,
 a step of reverse wavelet transformation of coefficients of the determined parts of the multidimensional image, and
 a step of synthesizing the plane from data calculated during the reverse wavelet transformation.

18. A system including one or more processors for converting raw multidimensional digital data ($x_k$) corresponding to points (k) making up a multidimensional image including a two dimensional (2D) or three dimensional (3D) image of an unknown size, the points forming lines along axes of the multidimensional image, the system comprising:
 means comprising one or more processors for sizing a multidimensional window and for traversing the multidimensional image of unknown size, wherein the sizing depends on a size of a buffer memory;
 means comprising the one or more processors arranged to traverse the multidimensional image for moving the multidimensional window in the multidimensional image along the axes of the multidimensional image;
 means comprising the one or more processors for acquiring and loading, at each position of the multidimensional window in the multidimensional image of unknown size, in the buffer memory, raw data ($x_k$) of a part of the multidimensional image of unknown size defined by the multidimensional window;
 conversion means comprising the one or more processors for calculating a multidimensional wavelet transform of the part loaded by means of at least one compact support filter for generating low-frequency ($s_k$) and high-frequency ($d_k$) coefficients, and for filtering, successively along each of the axes of the load part, each of the lines extending along the axis; and
 means comprising the one or more processors for saving the generated low-frequency ($s_k$) and high-frequency ($d_k$) coefficients in a memory.

* * * * *